United States Patent [19]
Cohen et al.

[11] 3,922,217
[45] Nov. 25, 1975

[54] REMOVAL OF POLAR COMPOUNDS FROM HYDROCARBON MIXTURES CONTAINING THE SAME

[75] Inventors: Georges Cohen, Rueil-Malmaison; Francis Gracco, Montesson; Paul Mikitenko, Chatou, all of France

[73] Assignee: Institut Francais du Petrole, Rueil-Malmaison, France

[22] Filed: May 14, 1974

[21] Appl. No.: 469,783

[30] Foreign Application Priority Data
May 17, 1973 France .............................. 73.18035

[52] U.S. Cl............. 208/299; 210/24; 260/676 AD; 260/674 SA; 252/420; 252/414; 210/30; 208/310
[51] Int. Cl.²........................ C07C 9/00; C07C 7/00
[58] Field of Search ........... 208/299, 290, 177, 308, 208/310; 260/676 AD, 674 SA, 677 A, 681.5; 210/23, 24

[56] References Cited
UNITED STATES PATENTS

| | | | |
|---|---|---|---|
| 2,974,178 | 3/1961 | Hwa et al............................ | 260/674 |
| 3,275,548 | 9/1966 | Walters et al........................ | 210/24 |
| 3,409,691 | 11/1968 | Small.............................. | 260/677 A |
| 3,628,927 | 12/1971 | Baumgartner .................. | 208/299 X |
| 3,751,507 | 8/1973 | Walker et al. .................. | 260/674 R |

*Primary Examiner*—Delbert E. Gantz
*Assistant Examiner*—Juanita M. Nelson
*Attorney, Agent, or Firm*—Millen, Raptes & White

[57] ABSTRACT

Process for removing polar compounds from solutions thereof in a liquid hydrocarbon comprising the steps of (a) contacting said solution with an ion-exchange resin containing at least 1 percent and for example from 5 to 30 percent by weight of water, (b) separating the hydrocarbon from the resin, and (c) regenerating the resin by treatment with a hydrocarbon or water.

26 Claims, 1 Drawing Figure

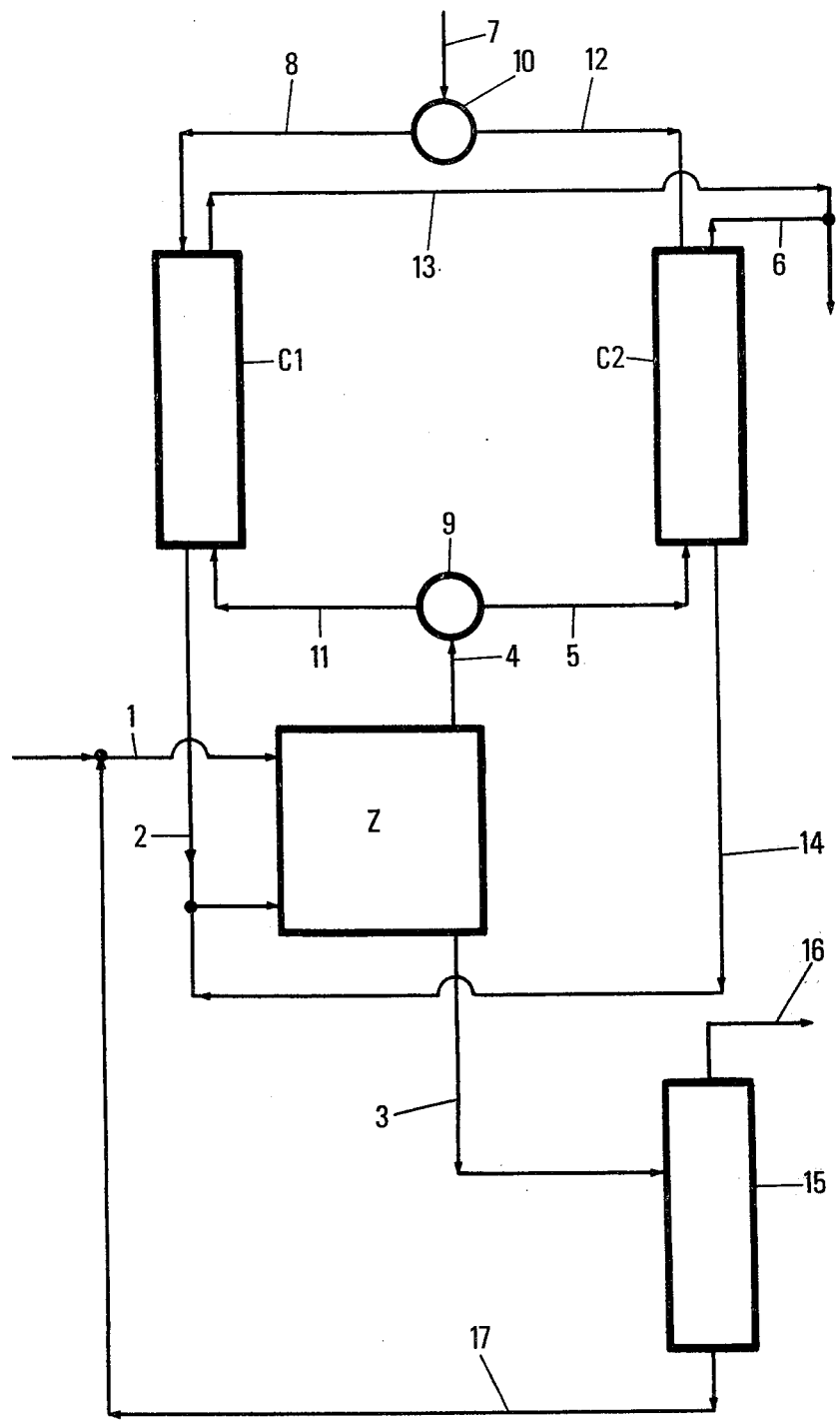

REMOVAL OF POLAR COMPOUNDS FROM HYDROCARBON MIXTURES CONTAINING THE SAME

This invention concerns the use of cationic or anionic water-containing ion exchange resins either of the macroporous or of the gel type, for removing polar compounds from mixtures containing the same together with hydrocarbons which are non-polar or weakly polar compounds.

It is known to carry out this separation by such processes as, for example, distillation, adsorption on silica gel or on molecular sieve, extraction with a solvent, usually water.

The present process, as compared to the above-mentioned processes, has the advantage of being carried out in a simple manner, none of the steps of the process requiring a substantial power supply always resulting in high cost.

This process is particularly well adapted to the treatment of mixtures containing a small proportion of a polar compound for which a high power consumption is not justified. For example, it may constitute one of the steps of a process, making use of one or more polar compounds, for separating hydrocarbons of different saturation degrees. We recover by means fo resins the one or more polar compounds carried along, usually in a small amount, with the non-adsorbed hydrocarbons during the extraction step.

This technique provides for the recovering of chemicals without modifying their properties while limiting the losses due to the successive manipulations, for example by avoiding the inconveniences due to the washings with water or to the extensive action of heat.

Moreover, the resin may be easily regenerated a great number of times and this constitutes an economical advantage of the process.

The use of the technique of the invention in extraction processes is however not limitative of the scope of the invention. The amount of polar compound is also not limitative, although the present process is particularly advantageous when this amount is not too high, for example when it is from a few parts per million of parts (for example 10 ppm) to 10 percent by weight, for example from 0.5 to 10 percent by weight.

The process is remarkable in that we remove the polar compounds from the mixture containing them together with hydrocarbons by contacting said mixture with a ion exchange resin containing at least 1 percent by weight of water and, for example, from 5 to 30 percent. Irrespective of the initial water content of the resin, it is observed that this content may change during the operation and settle to the vicinity of a given value which remains subsequently substantially unchanged.

In the case of treatment of a wet hydrocarbon charge (the water content of said charge usually does not exceed 0.1 percent by weight) when starting from a dry resin, water accumulates in the latter to attain a concentration corresponding to the invention requirements.

In the case where the water content of the resin is higher than said concentration, the water in excess will be progressively removed. The resins which can be used according to the invention are ion exchange resins of the cationic or anionic type, having a macroporous structure or being of the gel type.

We however prefer to use resins of the macroporous type. The resins are prepared from cross-linked polymers, for example of the polystyrene, polyacrylic, polymethacrylic or formophenolic type, forming a matrix in which are grafted active, acid or basic groups, these active groups being in most cases of a sulfonic, phosphoric, phosphonic or carboxylic type or being amine, trimethylammonium, dimethylethanolamine or quaternary ammonium groups, for example.

We use resins of the cationic type in their acid form or so treated that the exchangeable ion substituted to the proton $H^+$ be a metal cation selected preferably from those of groups 1 A, 1 B or VIII of the periodic classification of the elements or an ammonium or alkylammonium cation.

We have obtained good results particularly with such cations as potassium, silver, cobalt, $NH_4^+$ or alkylammonium groups By alkylammonium group we mean the following groups:

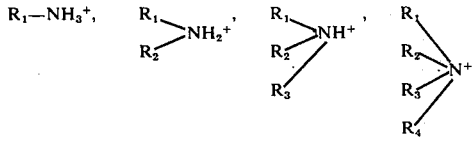

in which $R_1$, $R_2$, $R_3$, $R_4$ are any paraffinic or cycloaliphatic hydrocarbon radical or hydrocarbon radicals containing, for example, oxygen such as:

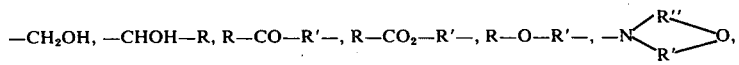

(R being a monovalent hydrocarbon radical and R' and R'' being divalent hydrocarbon radicals, identical to or different from each other).

The anionic resins are used in their hydroxy form or in the form of salts such as halides, sulfates, sulfites, carbonates, nitrates, phosphates, carboxylates, chromates and borates, for example.

The ion exchange capacity of these resins is generally from 0.1 to 6 equivalents per liter of resin and their rate of cross-linking with respect to divinylbenzene is from 1 to 60 % for example from 4 to 40 %.

We obtain a quick fixation of the polar molecules and an easy adsorption, particularly with the resins having a macroporous structure, whose specific surface is very high, higher than 20 m²/g and generally from 300 to 800 m²/g.

We have also obtained interesting results by using resins whose physical structure is of the gel type and which have a low specific surface.

We have furthermore observed that, when the resin is saturated with a polar compound, a mere washing with an elution agent suffices to restore the resin property to retain again the polar molecules. We proceed to the regeneration when it is observed that the recovered effluent has a polar compound content higher than the desired value. We may use, as elution agent, any hydrocarbon i.e. a light or heavy, paraffinic, cycloalphatic, olefinic, aromatic, acetylenic, branched or unbranched hydrocarbon, alone or contained in a hydrocarbon cut. We can also use water as elution agent.

This step is conducted at moderate temperature, generally, in practical conditions, at room temperature, but a lower or higher temperature may be also convenient provided that is is compatible with the hydrocarbons and the elution agent which must be kept in the liquid state.

The effluent from the regeneration step may, for example, be reused without being subjected to any particular treatment, or it may be at least partly distilled for recovering the polar compound, or discharged if it is more advantageous. We may also, when necessary, remove, by distillation, the hydrocarbons from the first recovered fractions.

The resins are used during the stage of fixation of the polar molecules by passing through said resins, optionally exchanged with the desired ion, the mixture containing the polar compound so as to recover an effluent consisting essentially of the less polar hydrocarbons.

We may use efficiently hourly flow rates in the range of from 1 to 100 times the bed volume and the amount of treated charge is advantageously in a proportion by weight, with respect to the resin, which is from 1:1 to 20 000:1, for example from 1:1 to 10 000:1, according to the type of purification or of the solvent recovering to be achieved.

The described resins have a very remarkable selectivity for the polar compounds and their action is sufficient to obtain, in a quick and easy manner, the removal of a polar compound contained in a mixture with less polar species at concentrations ranging generally up to 10 percent by weight and to obtain a residual concentration of a few parts per million of parts.

As a general rule, this step can be conducted at any temperature compatible with the stability of the resin and with the physical properties of the treated products. However, we prefer to proceed at the lowest possible temperature at which these advantages are obtained and in view of making the process advantageous, at close temperatures for the two steps of fixation and regeneration.

The treatment carried out on wet resins according to this invention, gives very good results which are better than those achieved by treatment with anhydrous resins, as far as the capacity and the selectivity of the resins towards polar compounds are concerned.

We have obtained good performances by making use of resins containing hydration water, i.e. for example, with a resin XE 284 (Rohm and Haas) which may contain up to 45 percent by weight of water.

Any water which may be contained in the mixtures of hydrocarbons with polar compounds to be treated is still present in the effluent obtained after passage over the resin. Generally, the water content of these mixtures does not exceed 0.1 percent by weight and, in most cases, is lower than 0.05 percent by weight and it has been observed that the use of an anhydrous resin or a weakly hydrated resin resulted in a dehydration of the stream with which it was contacted until the establishment, in the resin, of a stationary water content whose value generally depends on the nature of the solvent.

After that, the resin becomes inactive with respect to water and continues to retain the polar compound until its capacity with respect to the latter is attained. The experience has shown that the capacity, in operation, of the resin is improved by the presence of its hydration water.

The process of the invention is particularly convenient for separating as low amounts as traces and higher amounts up to 5 or 10 percent of one or more polar compounds in admixture with hydrocarbons.

By polar compound we mean, according to the invention, an organic compound containing carbon and at least one heteroatom such as O, S, N or P. It also usually contains hydrogen.

This compound is soluble in a proportion of at least 1 percent by weight in water and, conversely, water is soluble in a proportion of at least 1 percent by weight in said compound, at the temperature at which the process is conducted. This compound has also a substantial solubility in at least one hydrocarbon, for example a solubility of at least 10 ppm by weight, since the object of the invention is to treat solutions of polar compounds in hydrocarbons.

The following compounds, for example, may be mentioned:

Alcohols, for example secondary butyl alcohol, polyols such as glycol, sulfoxides, for example dimethylsulfoxide, amides, for example methylformamide, dimethylformamide, dimethylacetamide, lactames such as N-methylpyrrolidone, aldehydes such as furfural, sulfones such as sulfolane or dimethylsulfolane, oxazines such as morpholine, N-methyl morpholine, formylmorpholine, nitriles, ketones and esters.

The process of the invention may be performed by using, for example, fixed beds of resins, sufficiently packed to ensure a maximum contact surface with the charge to be treated. We may also use fluid beds conveniently stirred.

The polar compound yield of the operation may be improved by passing over a second column of regenerated resin the effluent recovered after passage over a first column and whose polar compound content is higher than the desired maximum content.

The accompanying diagram FIG. 1) illustrates the process of the invention but is not limitative of the scope thereof.

Z is an apparatus in which a mixture of hydrocarbons of different saturation degrees and a polar compound or solvent are contacted.

The solvent is introduced through line 1 and the hydrocarbons through line 2. The extract containing the major part of the solvent and the less saturated hydrocarbons is recovered through line 3 while the raffinate, consisting of the most saturated hydrocarbons and a small amount of solvent, is discharged through line 4.

We make use of two columns C 1 and C 2, containing a wet ion exchange resin, which in one column, is under regeneration while, in the other one, it is in operation.

When operating the plant the raffinate is supplied through line 5 to column C 2, whose resin has been regenerated. The mixture is contacted with the resin which preferentially retains the solvent contained therein. We recover, through line 6, the raffinate free of solvent.

Simultaneously, the column C 1 is fed, through line 7 and line 8, with a portion or the totality of the hydrocarbon charge to be treated, carrying therewith the solvent retained by the resin. The mixture is then supplied to Z through line 2.

We feed column C 2 until the capacity of the resin is attained and so that the total solvent content of the recovered raffinate does not exceed a given specified content generally lower than a few tens of ppm, preferably lower than 10 ppm by weight.

The valves 9 and 10 are then actuated so as to feed column C 1 with the raffinate, through line 11, and column C 2 with the charge to be treated, through line 12.

The raffinate, free of solvent, is then recovered through line 13 and the hydrocarbon charge, carrying along the solvent therewith, joins line 2 through line 14.

The mode of operation of the columns C 1 and C 2 is then reversed at regular time intervals.

It is advantageous to make use of three columns of resin, two of which are arranged in series and operated in the fixation step while simultaneously, the third column is operated in a regeneration step. The number of columns is of course not limitative of the scope of the invention.

The extract discharged from line 3 is fed to a distillation column 15 or to any other apparatus such as 11 in which it is separated into its constituents. The hydrocarbons are recovered from line 16 and the solvent through line 17, which joins line 1.

The following non limitative examples will give a better understanding of the invention.

EXAMPLE 1 (comparative)

The treated mixture contains by weight:
1.98 % of dimethylformamide,
97.95 % of paraffinic and naphthenic hydrocarbons (having 6, 7 and 8 carbon atoms),
0.07 % of benzene.

This mixture is contacted with 15 g of a XE 284 resin contained in a column of a 60 cm height and maintained at a temperature close to 25°C.

This resin is a cationic macroporous resin having a specific surface of about 600 m²/g and whose rate of crosslinking with respect to divinylbenzene is high, said resin being sold by Rohm and Haas in the H⁺ form. This resin is preliminarily exchanged by contact with an aqueous solution of potash so as to replace the H⁺ ions by K⁺ cations. Then the resin is washed and dried under vacuum and its water content is then about 0.23 percent by weight.

The mixture flows through the column at a rate of 153 g/h.

The resulting mixture has a total dimethylformamide content lower than 10 ppm by weight during five hours; after 5 hours of operation, we observe a noticeable increase of the dimethylformamide content of the recovered effluent. We then stop the operation and we proceed to the regeneration.

By regeneration at the same temperature with an elution agent consisting of a hydrocarbon cut, containing 75 percent of aromatics such as benzene and toluene and 25 percent of paraffinic and naphthenic hydrocarbons of the same nature as those contained in the treated mixture, we have recovered mixtures containing 15.15 g of dimethylformamide.

EXAMPLE 2

Example 1 is repeated, except that the treated mixture further contains 0.05 percent by weight of water.

The flow rate is so adjusted that the amounts of injected mixture, with the exception of the water amount, are the same as in example 1.

It is observed, after several adsorption and regeneration cycles, on the one hand, that the water content of the resin has increased during the process up to a stabilized content of 13–14 percent and, on the other hand, that the amount of solvent-containing hydrocarbons, treated by the resin, has increased after the water content of the resin has been stabilized.

We observe that the increase of the solvent content in the effluent occurs after 5 hours 30 minutes; accordingly, the resin capacity is increased by about 10 percent.

EXAMPLE 3

Through a sufficiently packed resin bed contained in a column of a 80 cm height and a 0.7 cm diameter, we introduce a solution having the following composition by weight:
n-hexane: 63 percent
n-heptane: 30 percent
benzene: 5 percent
dimethylformamide: 2 percent,
said solution being circulated upwardly.

The resin of this bed is a macroporous, macrocrosslinked resin with a polystyrene skeleton cross-linked with divinylbenzene, initially containing highly acid SO₃H groups which are treated so as to replace the H⁺ ion by the NH₄⁺ cation. For this purpose, we proceed to a washing with sulfuric acid in order to be sure that all the groups are converted to the SO₃H form and then, we treat the resin with a normal solution of NO₃NH₄. The resin is then extensively washed with demineralized water in order to remove any trace of unreacted nitric acid or ammonium nitrate. The so-prepared resin is in active form.

When it is observed that the recovered product contains more than 20 ppm by volume of dimethylformamide, we proceed to the regeneration of the resin by circulating downwardly through the column a mixture having the following composition by weight:

benzene: 70 percent
non-aromatic hydrocarbons: 30 percent.
This constitutes a cycle.
The temperature of the column is maintained at 25°C.
The resin weight is 15.4 g (dry weight).

We observe that:
1. by making use of a dry resin (water content: 0.2 percent by weight), and of dry products, we treat, at each cycle, 185 g of solution which gives an effluent containing 20 ppm by volume of dimethylformamide and we make use of 573.5 g of elution agent.

$$\text{The ratio by weight } \frac{\text{elution agent}}{\text{treated solution}} = 3.1$$

and the operating capacity of the resin is 24.02 percent by weight; 2. by using a dry resin (0.2 percent by weight of water), and a wet charge (water content close to 0.1 percent by weight) the amount of treated charge is 185 g for the first cycle and progressively increases up to a stabilized amount of 215 g while resulting in an effluent containing 20 ppm by volume of dimethylformamide. It is observed that, at this stage, the water content of the resin settles at 13.6 percent by weight.

The ratio elution agent/treated solution at each cycle is 3.1.

The capacity of the resin reaches 27.92 percent by weight; 3. by using a wet resin (water content of 30.35 percent by weight) and a wet charge (0.1 percent by weight of water), we attain an equilibrium state of the system which gives the same results as in paragraph 2 above. In particular, the water content of the resin settles at about 13.6 percent by weight.

EXAMPLE 4

Through a resin bed similar to that of example 3, we pass a charge having the following composition by weight:

$C_6$ olefins and cycloolefins: 10 percent
N-heptane: 39 percent
Cyclohexane: 20 percent
Benzene: 30 percent
Dimethylformamide: 1 percent The temperature of the column is 40°C.
The resin weight is 14 g (dry weight).
The water content of said resin is 14 percent.
The elution agent has the following composition by weight:

Benzene: 97 percent
Non-aromatic hydrocarbons: 3 percent

At each cycle we, accordingly, treat 380 g of charge for obtaining an effluent containing less than 10 ppm by volume of dimethylformamide; 800 g of elution agent are required for regenerating the resin. The ratio elution agent/charge is 2.1

EXAMPLE 5

In a column containing a resin similar to that of example 3, we treat 35 kg of a charge consisting of a solution of dimethylsulfoxide at a 7.3 ppm concentration by volume in a mixture consisting of 80 percent of pentane and 20 percent of a mixture of aromatics (benzene, toluene, xylene). We proceed at 40°C under a pressure of 2 atmospheres. We make use of 4.6 g of resin (dry weight) containing 20 percent by weight of water. We obtain an effluent the DMSO content of which is not detectable (less than 0.1 ppm by volume).

100 g of water are used for the regeneration.

EXAMPLE 6

1 400 g of a solution having a 0.2 percent by weight content of dimethylsulfoxide in isooctane is treated with 10.7 g of a resin identical to that of example 3, at a temperature of 40°C.

We obtain an effluent whose DMSO content is about 20 ppm by volume.

The resin is regenerated at 70°C at each cycle with 740g of an elution agent consisting of 80 percent by weight of $C_6$–$C_7$ aromatics and 20 percent by weight of $C_6$–$C_8$ paraffins.

EXAMPLE 7

195 g of a solution consisting of 85 percent by weight of heptane, 14 percent by weight of toluene and 1 percent by weight of N-methyl pyrrolidone is treated with 10 g (dry weight) of resin in the $NH_4^+$ form described in example 3, said resin having a 15 percent by weight water content. The resulting mixture contains less than 10 ppm by weight of N-methyl pyrrolidone. The resin is regenerated at 60°C by means of 545 g of a mixture containing 90 percent of toluene and 10 percent of ($C_6$–$C_8$) paraffinic and cycloparaffinic hydrocarbons.

EXAMPLE 8

15 g of the same wet resin are used at 25°C for treating 165 g of a mixture containing 90 percent by weight of heptane, 8 percent by weight of toluene and 2 percent by weight of acetonitrile.

The effluent contains 17 ppm by weight of acetonitrile.

The regeneration is performed at 25°C with 500 g of a mixture consisting of 65 percent by weight of benzene and 35 percent by weight of hexane.

EXAMPLE 9

We make use of 5 g of the same wet resin for treating, at 60°C, 10 Kg of a mixture containing 25 percent of aromatics (mixture of benzene, toluene and xylenes) and 75 percent of heptane, said mixture having a sulfolane content of 20 ppm by weight.

The resulting mixture contains less than 0.2 percent by weight of sulfolane.

The resin is regenerated at 60°C with 150 g of water.

We claim:

1. In a process for removing a polar compound from a solution thereof in a liquid hydrocarbon by contacting said solution with a macroporous or gel-type cation exchange resin the improvement wherein said cation exchange resin contains at least 1 percent by weight of water and the hydrocarbon is subsequently separated from the resin on which at least a portion of the polar compound has been retained, said polar compound being an alcohol, a glycol, a sulfoxide, an amide, a lactam, an aldehyde, a sulfone, an oxazine, a nitrile, a ketone or an ester.

2. A process according to claim 1, in which the resin contains from 5 to 30 percent by weight of water.

3. A process according to claim 1, in which the resin is a macroporous resin.

4. A process according to claim 1, in which the resin is a cationic gel-type resin.

5. A process according to claim 1, in which the polar compound content of the solution is from 10 ppm to 10 percent by weight.

6. A process according to claim 1, in which the ratio by weight of the solution of polar compound to the resin is from 1:1 to 20 000:1.

7. A process according to claim 1, in which the resin, enriched with polar compound, is then separated from the solution and treated with a hydrocarbon in order to be regenerated.

8. A process according to claim 1, in which the resin, enriched with polar compound, is then separated from the solution and treated with water in order to be regenerated.

9. A process according to claim 1 wherein the polar compound is dimethylsulfoxide, dimethylformamide, N-methyl pyrrolidone, acetonitrile or sulfolane.

10. A process according to claim 1 wherein the hydrocarbon solution of the polar compound contains at most 0.1% by weight water.

11. A process according to claim 7, in which the regenerated resin is contacted with a further solution of polar compound in liquid hydrocarbon to form a cyclical process.

12. A process according to claim 11, in which the resin contains from 5 to 30 percent by weight of water.

13. A process according to claim 11, in which the resin is a macroporous resin.

14. A process according to claim 11, in which the resin is a cationic gel-type resin.

15. A process according to claim 11, in which the polar compound content of the solution is from 10 ppm to 10% by weight.

16. A process according to claim 11, in which the ration by weight of the solution of polar compound to the resin is from 1:1 to 20 000:1.

17. A process according to claim 11, wherein the polar compound is dimethylsulfoxide, dimethylformamide, N-methyl pyrrolidone, acetonitrile or sulfolane.

18. A process according to claim 11, wherein the hydrocarbon solution of the polar compound contains at most 0.1% by weight water.

19. A process according to claim 8, in which the regenerated resin is contacted with a further solution of polar compound in liquid hydrocarbon to form a cyclical process.

20. A process according to claim 19, in which the resin contains from 5 to 30 percent by weight of water.

21. A process according to claim 19, in which the resin is a macroporous resin.

22. A process according to claim 19, in which the resin is a cationic gel-type resin.

23. A process according to claim 19, in which the polar compound content of the solution is from 10 ppm to 10% by weight.

24. A process according to claim 19, in which the ratio by weight of the solution of polar compound to the resin is from 1:1 to 20 000.1.

25. A process according to claim 19, wherein the polar compound is dimethylsulfoxide, dimethylformamide, N-methyl pyrrolidone, acetonitrile or sulfolane.

26. A process according to claim 19 wherein the hydrocarbon solution of the polar compound contains at most 0.1 percent by weight water.

* * * * *